United States Patent [19]

Ishii et al.

[11] Patent Number: 4,972,500
[45] Date of Patent: Nov. 20, 1990

[54] IMAGE DENSITY PROCESSOR

[75] Inventors: Hiroaki Ishii, Tokyo; Katsunori Kato, Kawasaki, both of Japan

[73] Assignee: Canon Kabushiki Kaisha, Tokyo, Japan

[21] Appl. No.: 372,171

[22] Filed: Jun. 27, 1989

Related U.S. Application Data

[63] Continuation of Ser. No. 775,014, Sep. 11, 1985, abandoned.

[30] Foreign Application Priority Data

Sep. 17, 1984 [JP] Japan .................. 59-192604

[51] Int. Cl.$^5$ .................. G06K 9/38; G06K 9/40
[52] U.S. Cl. .................. 382/50; 382/54; 358/457; 358/458
[58] Field of Search .................. 382/50, 52, 54; 358/447, 457, 458, 460, 461, 456

[56] References Cited

U.S. PATENT DOCUMENTS

| | | | |
|---|---|---|---|
| 4,003,024 | 1/1977 | Riganati et al. | 382/54 |
| 4,258,393 | 3/1981 | Ejiri et al. | 358/457 |
| 4,402,015 | 8/1983 | Yamada | 358/280 |
| 4,430,748 | 2/1984 | Tuhro et al. | 340/728 |
| 4,468,692 | 8/1984 | Yamada et al. | 358/80 |
| 4,491,875 | 1/1985 | Kawamura | 358/457 |
| 4,506,382 | 3/1985 | Hada et al. | 382/54 |
| 4,534,059 | 8/1985 | Yamada | 382/54 |
| 4,586,089 | 4/1986 | Nakazato et al. | 358/280 |
| 4,667,251 | 5/1987 | Hasegawa | 358/457 |
| 4,723,173 | 7/1987 | Tanioka | 358/465 |

Primary Examiner—Leo H. Boudreau
Assistant Examiner—Michael R. Cammarata
Attorney, Agent, or Firm—Fitzpatrick, Cella, Harper & Scinto

[57] ABSTRACT

There is an image processing apparatus which can further digitally control the density of the image signal read out from the image file in which the dither-processed image signal was stored. This apparatus comprises an input device to input the dither-processed image signal, table memories which output the density correction data using the image signal of a plurality of bits inputted by the input device as an input address, and a visible output device to output the outputs of the table memories as visible outputs, wherein the input device reads out the dither-processed image signal from the image file.

10 Claims, 7 Drawing Sheets

Fig. 4A

| 0 | 8 | 2 | 10 |
|---|---|---|----|
| 12 | 4 | 14 | 6 |
| 3 | 11 | 1 | 9 |
| 15 | 7 | 13 | 5 |

Fig. 4B

| 0 | 8 | 2 | 10 |
|---|---|---|----|
| 12 | 4 | 14 | 6 |
| 3 | 11 | 1 | 9 |
| 15 | 7 | 13 | 5 |

Fig. 4C

| 0 | 8 | 2 | 10 |
|---|---|---|----|
| 12 | 4 | 14 | 6 |
| 3 | 11 | 1 | 9 |
| 15 | 7 | 13 | 5 |

Fig. 7

IMAGE DENSITY PROCESSOR

This application is a continuation of application Serial No. 06/775,014 filed Sept. 11, 1985, now abandoned.

BACKGROUND OF THE INVENTION

1. Field of the Invention

The present invention relates to an image processing apparatus for further performing a predetermined processing of an image signal which has been dither-processed.

2. Description of the Prior Art

Hitherto, in such a kind of apparatus, the image information read by an image input apparatus is converted into an electrical signal (dither image signal) and stored in an image information storage device. This electrical signal is outputted as a visible image by a desired image output apparatus (printer, display device, or the like) remote from the local communication. However, with respect to the density of the image output apparatus, various reference densities is set in the respective kinds of apparatus, so that an image is outputted with the density which is proper to the particular output apparatus being used, and a clear image cannot be obtained. In addition, there is the drawback that the density of the image which is outputted from the image output apparatus varies in dependence on the state of, for example, an optical disc device used for storing dither image information or due to external influences such as from the local communication, or the like. As mentioned above, conventionally, there is the drawback that it is impossible to control the density of the dither image information stored in the image information storage device before the image is output by such as printing, display, or the like.

SUMMARY OF THE INVENTION

It is an object of the present invention to provide an image processing apparatus which can solve the drawbacks in the conventional technology as mentioned above.

Another object of the invention is to provide an image processing apparatus which can further correct the density of the image signal which has been dither-processed.

Still another object of the invention is to provide an image processing apparatus which can digitally control the image density of the image signal read out from an image file in which the dither-processed image signal was stored.

Other objects and features of the present invention will be more apparent from the following detailed description in conjunction with the accompanying drawings.

BRIEF DESCRIPTION OF THE DRAWING

FIGS. 4A to 4C are diagrams to explain the density correction due to a dither matrix;

FIGS. 6A, 6B and 7 are diagrams to explain the operation of the invention.

DETAILED DESCRIPTION OF THE PREFERRED EMBODIMENT

Figure 1:
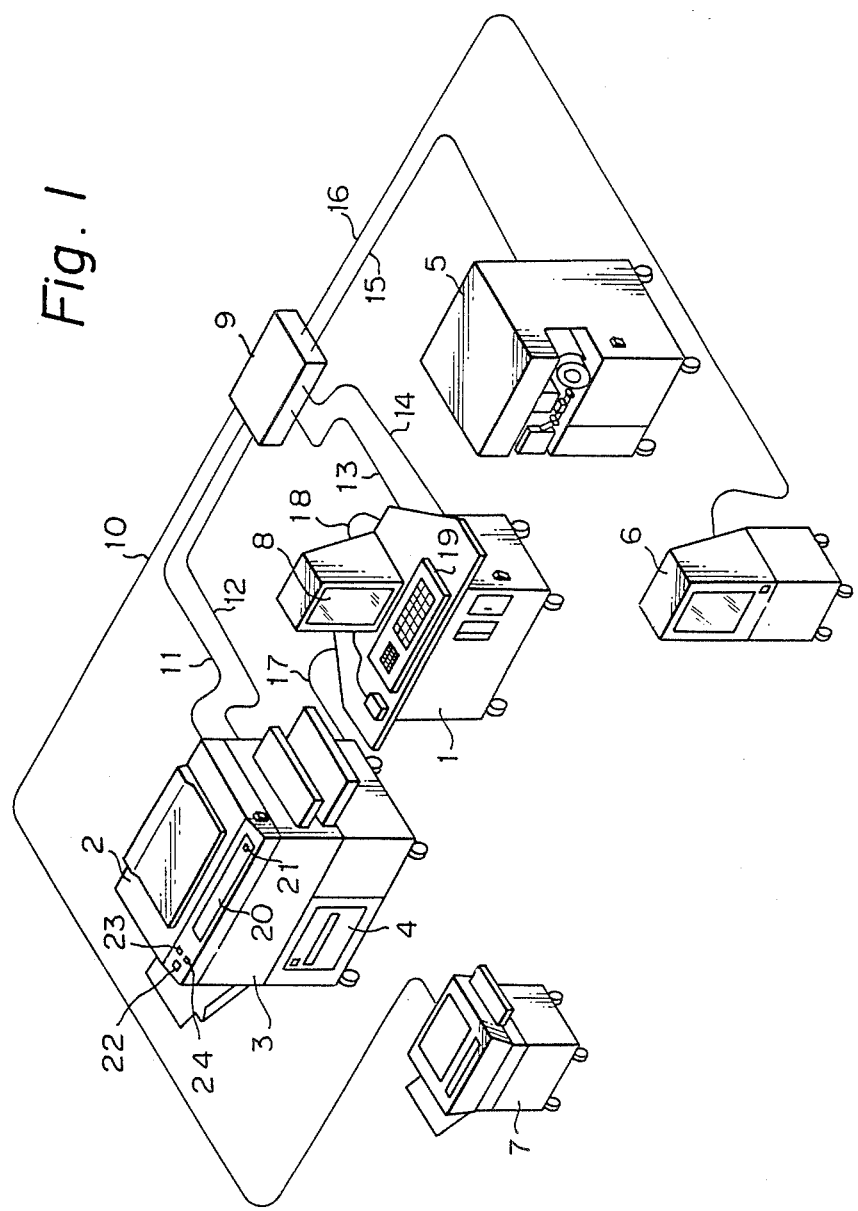
FIG. 1 is an external view of an image processing system to which the present invention is applied.

FIG. 1 is an external connection diagram of an image processing system to which the present invention is applied, in which reference numeral 1 denotes a control section (work station) comprising: an internal memory which is constituted by a microcomputer for system control, a RAM, a ROM, etc.; and an external memory which is constituted by a floppy disk, a cartridge disk, or the like. This control section constitutes image processing means of the present invention. Numeral 2 represents a document reader corresponding to the input section of a digital copier and serving to convert information of a document set on an original plate into an electrical signal by means of an image pickup device such as a CCD or the like. This document reader constitutes means for inputting image information of the present invention. Numeral 3 is a high-speed printer corresponding to the output section of the digital copier and serving to record an image on a recording material by a laser printer or the like in accordance with the information converted into the electrical signal. An image file 4 has a recording medium such as an optical disc, a photomagnetic disc, or the like and a great amount of image information can be written in and read out from this image file. A microfilm file 5 is provided with a microfilm search section and a microfilm reader section for converting the image information on the microfilm searched into an electrical signal by way of an image pickup device. Numeral 6 is a soft display of high resolution having a photosensitive belt which is constituted by depositing a photoconductive layer on a transparent band-like conductive substrate. By radiating the laser beam modulated in response to an image signal inputted onto the photoconductive layer through the substrate, the soft display 6 forms an electrostatic latent image responsive to the light and shade of the image light on the photoconductive layer and develops this latent image formed by the toner (developing agent) having conductivity and magnetism held on the toner supporting member, thereby forming a display image. Numeral 7 is a printing device such as a laser beam or the like which is similar to the high-speed printer 3. The printing device 7 is smaller and executes the image formation at a lower speed as compared with the high-speed printer 3 and is installed as necessary. A CRT device 8 displays the image information which was photoelectrically read by the digital copier and an input scanner (reader) of the microfilm file, or the control information of the system, or the like. The CRT device 8 is provided with a display RAM 8a (see FIG. 2) to store the image information to be displayed. A changeover device 9 switches the mutual connection among respective input/output apparatuses in response to a signal from the control section 1. Cables 10 to 18 serve to electrically connect the respective input/output apparatuses. A keyboard 19 is provided for the control section 1. By operating the keyboard 19, an operation command for the system, an image processing command and the like are inputted to the control section 1. An operation panel 20 is provided to perform an operation command of the digital copier and has setting keys to set a copy quantity, a copy magnification and the like, a copy key 21 to instruct the start of the copying operation, a numerical value indicator, etc. Numeral 22 is a mode change-over switch, and 23 and 24 are indicators consisting of light emitting diodes (LED) for indicating the mode selection state of the mode change-over switch 22.

Figure 2:
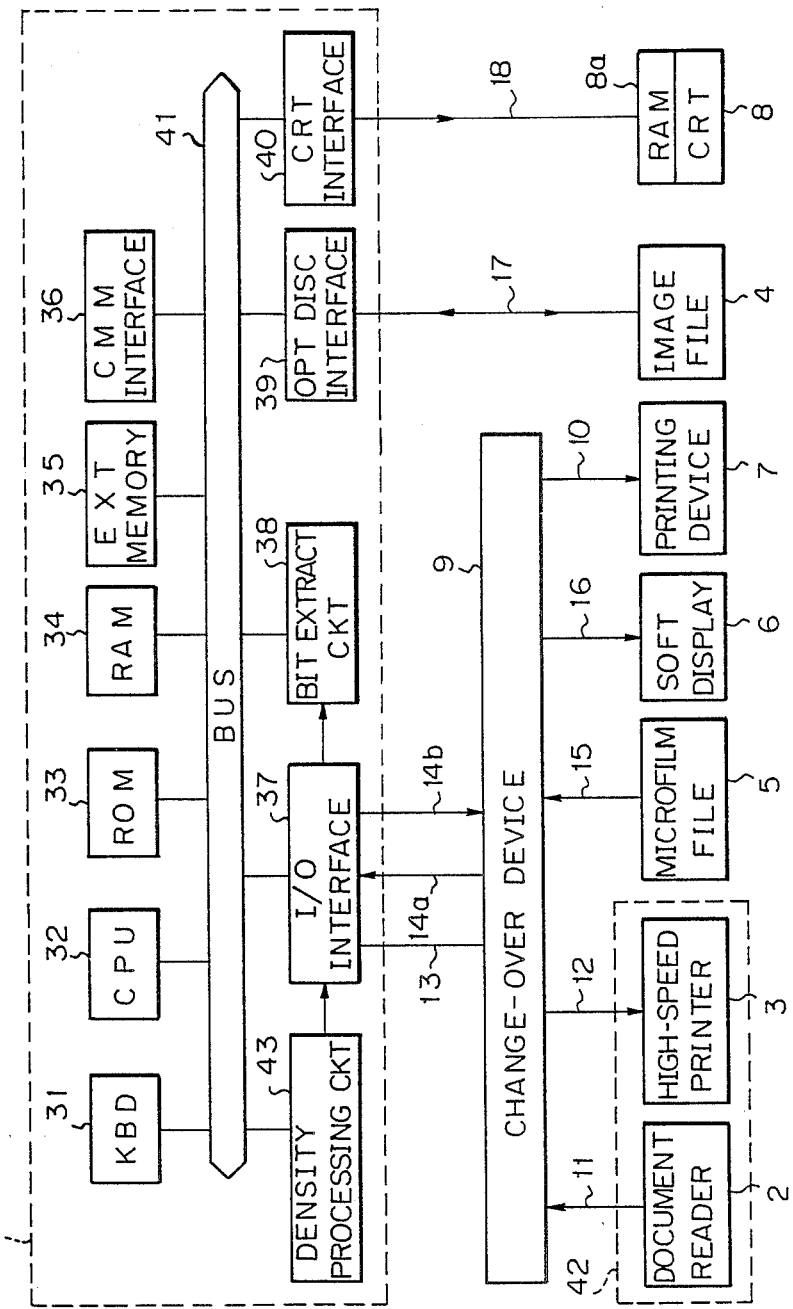
FIG. 2 is a block diagram showing a circuit arrangement of the image processing system shown in FIG. 1.

FIG. 2 is a block diagram showing a circuit arrangement of the image processing system shown in FIG. 1, in which the blocks corresponding to those shown in FIG. 1 are designated by the same reference numerals, except as otherwise voted. Initially, each block in the control section 1 will be explained.

In FIG. 2, a keyboard 31 corresponds to the keyboard 19 shown in FIG. 1. The operator inputs an operation command of the system by the keyboard 31. A central processing unit (CPU) 32 consists of a microcomputer (e.g., type 68000 made by Motorola Semiconductor Co., Ltd.). A control program of the system has been preliminarily stored in a read only memory (ROM) 33. The CPU 32 executes the control operation in accordance with the program written in the ROM 33. A random access memory (RAM) 34 serves as an image information storage means of the present invention and is mainly used as a working memory of the CPU 32 and a page memory to store image signals which are transmitted and received between the respective input/output sections. The control program of the system, a data base to search an image from the image file 4, and the like are stored in an external memory 35 consisting of a floppy disk. A communication interface 36 makes it possible to transmit and receive information to and from other similar system or terminals by use of a communication circuit such as a local area network or the like. An input-output interface 37 is provided to perform the transmission and reception of information between the control section 1 and the change-over device 9. A bit extract circuit 38 performs the thinning out processing of the image signal in accordance with a predetermined rate. An optical disc interface 39 is provided to perform the transmission and reception of information to and from the image file 4. A CRT interface 40 serves to perform the transmission and reception of information to and from the CRT device 8. A signal from any block in the control section 1 is transferred through a bus 41 of sixteen bits. A digital copier 42 consists of a document reader 2 and a high-speed printer 3. The digital copier 42, microfilm file 5, soft display 6, and printing device 7 are respectively connected to the change-over device 9 by the cables 11, 12, 15, 16, and 10. The change-over device 9 is connected to the input-output interface 37 in the control section 1 through the cable 13, 14a and 14b. A density processing circuit 43 serves as a density processing means of the present invention and will be described in detail hereinafter. As mentioned above, the respective input/output apparatuses are electrically connected by the cables 11 to 18 and control signals and image signals are transmitted through these cables. Each arrow of the cables 11 to 18 indicates the flow of the image signal, and the control signal flows bidirectionally through the cable having two arrows. On one hand, the image file 4 and CRT device 8 are connected to the optical disc interface 39 and the CRT interface 40 in the control section 1 by way of the cables 17 and 18, respectively. The image signals which are inputted and outputted by the change-over device 9 are serial signals, while the information on the bus 41 of the control section 1 is a parallel signal. Therefore, the input/output interface 37 is provided with a serial-parallel register to fetch the image signals and a parallel-serial register to output the image signals.

The control operation will now be explained.

The image signal which is outputted from the document reader 2 or microfilm file 5 is inputted to the input-/output interface 37 in the control section 1 through the change-over device 9 on a line by line basis. The input-/output interface 37 converts the image signal inputted serially into a parallel signal on a 16-bit unit basis and then outputs onto the bus 41. The image signal outputted onto the bus 41 is sequentially inputted into the image area in the RAM 34 on one-page unit basis. The image signal stored in the RAM 34 in this way is again outputted to the bus 41 and sent into the image file 4 through the communication interface 36 and written in the optical disc. Or, this image signal is outputted to the change-over device 9 through the input/output interface 37 and is selectively transmitted to the high-speed printer 3, soft display 6 or printing device 7, so that an image is formed.

At this time, in the case of controlling the density of the output image, the dither image signal written in the RAM 34 is transmitted to the density processing circuit 43 and is subjected to density adjustment processing, and thereafter it is transmitted to the high-speed printer 3 or the like through the input/output interface 37.

After the image signal read out from the optical disc of the image file 4 has once been written into the RAM 34, it can be transmitted through the interface 37 to either of the high-speed printer 3, the soft display 6 and the printing device 7. The image signal from the change-over device 9 can also be selectively and directly transmitted to either of the high-speed printer 3, the soft display 6 and the printing device 7 without passing through the control section 1 from the change-over device 9. In other words, in the case where the operator wants to perform a simple copying operation, or the like, the image signal from, e.g., the document reader 2 is supplied directly to the high-speed printer 3 without passing through the image file 4, thereby executing the copying operation in a real time manner. This mode is called a pass mode.

The above-mentioned control regarding the transmission of the image signals is executed by the CPU 32 by use of the keyboard 31 in accordance with the operation command inputted by the operator.

The principle of the image density correcting process using a dither matrix (Bayer's pattern) of 4×4 will be now described with reference to FIG. 3.

Figure 3:
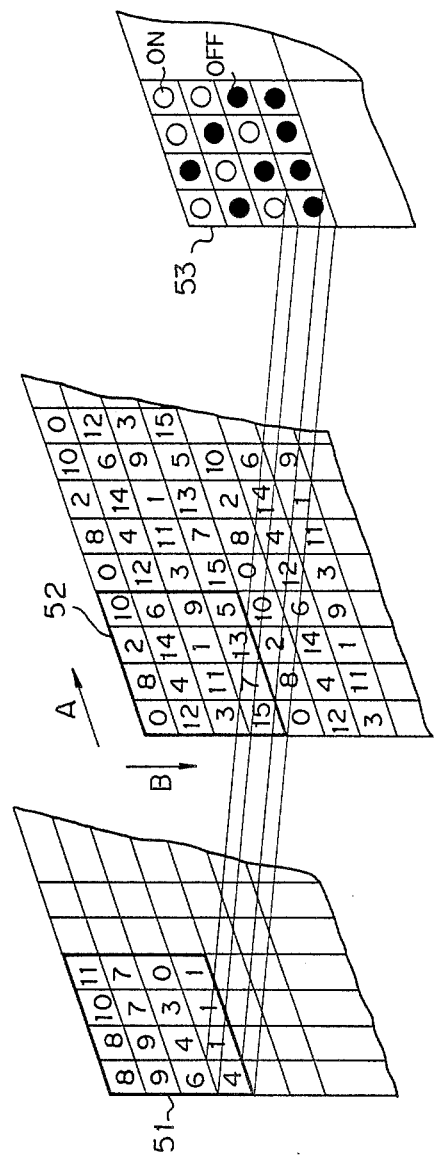
FIG. 3 is a diagram to explain the image density correcting process of the invention.

FIG. 3 shows a dither matrix pattern which is applied to the present invention.

In this diagram, reference numeral 51 denotes a pixel of the input image read out from the image file 4 and each numerical value represents the level of brightness of the image. Numeral 52 indicates a dither matrix of 4×4 elements, in which each numerical value indicates a threshold value. A display device 53 is provided with display cells in correspondence to the dither matrix 52 of 4×4 elements. The dither image information is formed in response to the ON and OFF condition or state of the display device 53 and is stored in the image file 4. A indicates the main-scan direction and B denotes the sub-scan direction. The pixel 51 consisting of sixteen (4×4) cells is shown with respect to the case where sixteen values from 0 to 15, are presented.

The threshold value of the fourth row and the first column of the dither matrix 52 is 15 and the brightness of the pixel 51 corresponding thereto is 4, so that the display cell of the display device 53 is OFF (black). In this manner, the images which are sequentially inputted are converted into dither images for every pixel 51 by way of the dither matrix 52 of 4×4. At this time, in comparison between the dither matrix 52 of 4×4 and the pixel 51, eight of the display cells of 4×4 are set to ON. When taking into account the whole display screen, 8/16 of all display cells are set to ON. If the brightness levels of all pixels of the input image are 6, 6/16 of all display cells are set to ON. Namely, the brightness of the input image is proportional to the number of display cells which are ON.

Therefore, the dither image signal read out from the image file 4 can reproduce the light and shade of the intermediate gradient, in which one pixel unit consists of four bits in the main-scan direction A and four lines in the sub-scan direction B. In other words, to control the light and shade of the dither image, 4×4 bits of the image signal are regarded as one unit with regard to the main-scan and sub-scan directions and the pixel may be turned ON and OFF (inverted) in the order of the weights of the dither matrix 52. Practically speaking, in the case where the image signal (shown in FIG. 4A), in which the pixels whose weights are up to 8 in the dither matrix 52, are black, is made dark by one step by the dither matrix 52, the pixels of weight of 9 are inverted and may be set from white to black, as shown in FIG. 4B. On the contrary, in order to make the image signal light by one step, the pixels of the weights of 8 may be inverted from black to white, as shown in FIG. 4C. By performing such processes with respect to all pixels on a (4×4) unit basis, the light and shade of the image can be controlled.

Figure 5:
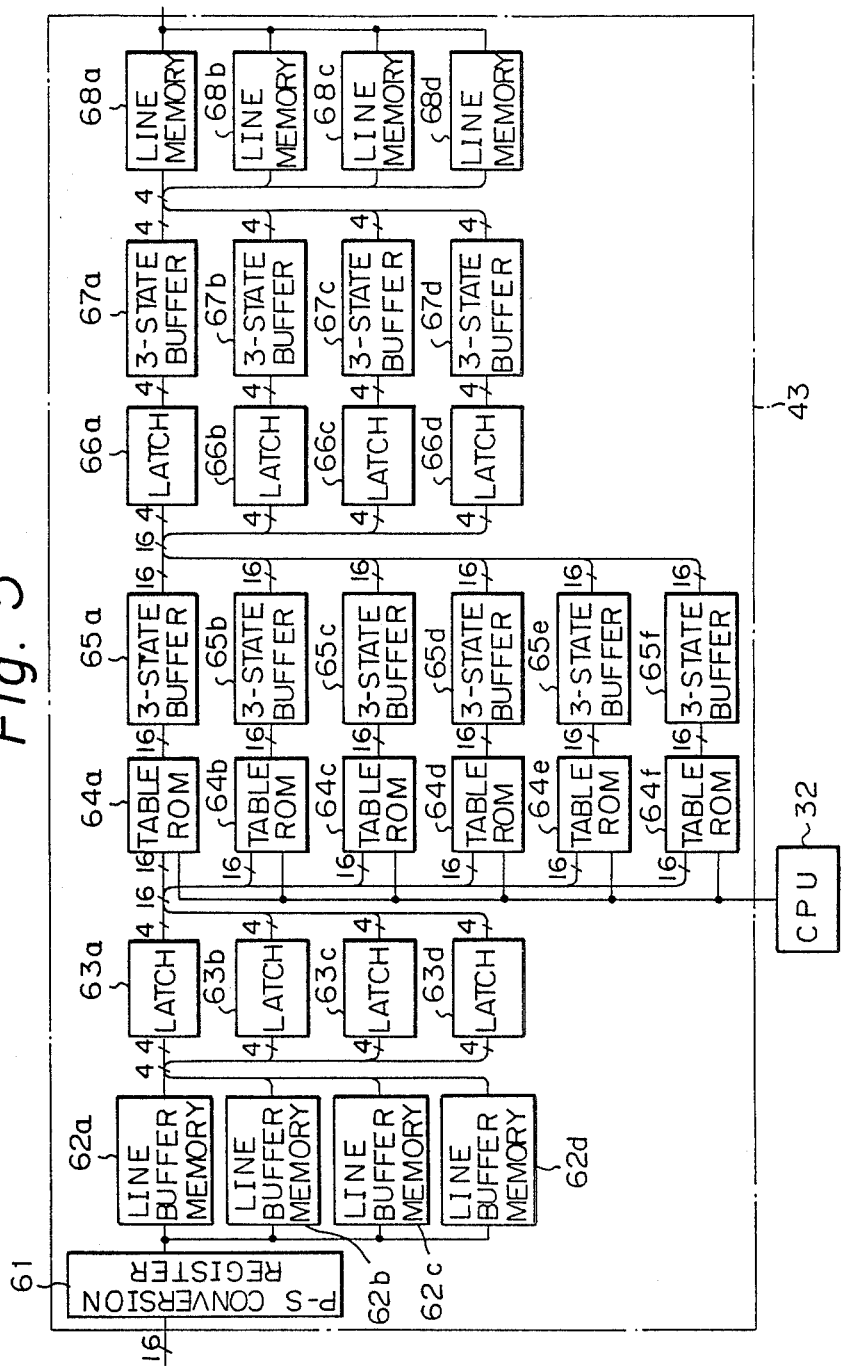
FIG. 5 is an arrangement block diagram of density processing means showing one embodiment of the present invention.

FIG. 5 is an arrangement block diagram of the density processing means showing one embodiment of the invention, in which numerals 32 and 43 denote the same parts as those shown in FIG. 2; 61 is a parallel-serial conversion register to convert the parallel image signal into serial data; 62a to 62d are line buffer memories to store the image signal converted into the serial data by the conversion register 61 by dividing it into four lines; and 63a to 63d are latches which latch the image data of four bits in the main-scan with respect to four lines in the sub-scan, thereby to make it possible to fetch the dither image signal subjected to dither processing as a unit pixel of 16 bits for every four bits in the main-scan and sub-scan directions, respectively. The density control tables of unit pixels in the dither images are stored in table ROMs 64a to 64f. One of the table ROMs 64a to 64f is selected in response to a command of the CPU 32. Numerals 65a to 65f are three-state buffers to take out the control data (16 bits) of the dither image whose density has been adjusted by the table ROMs 64a to 64f. Latches 66a to 66d latch the control data of the dither image of 16 bits on a four-bit unit basis from the higher significant bit. Three-state buffers 67a to 67d are sequentially chip-enabled and take out the control data latched by the latches 66a to 66d from the higher significant bit for every line, in which one bit is fetched in the main-scan direction and four dither image signals are fetched in the sub-scan direction. Line memories 68a to 68d store the dither image signals formed by the three-state buffers 67a to 67d.

The operation will now be explained.

Figure 6:
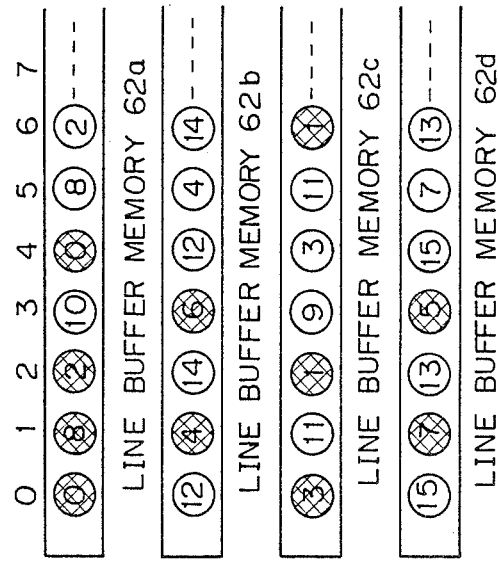

When the operator inputs the density adjustment command from the keyboard 31, the image signal written from the image file 4 through the optical disc interface 39 into the RAM 34 is inputted as parallel data to the density processing circuit 43 through the bus 41 in response to a command of the CPU 32. Then, the parallel-serial conversion register 61 first converts the 16-bit image signal inputted to serial data and this serial data is sequentially fetched into the respective line buffer memories 62a to 62d on a 4-bit unit basis. Namely, the 16-bit image signal is divided into four lines and stored. The image signals stored have the same memory address and are stored from the head of the line. Thus, by simultaneously reading out the data in the same address from the respective line buffer memories 62a to 62d and latching the image signals read out by the latch 63a, image data of one bit in the main-scan direction can be fetched as parallel data as shown in FIG. 6A with regard to four lines in the sub-scan direction. By repeating the foregoing process a total of four times and latching by the latches 63a to 63d, the unit pixels in the dither image subjected to the dither process on a 4-bit unit basis with regard to the main-scan and sub scan, respectively, can be taken out as 16-bit parallel data as shown in FIG. 6B. The CPU 32 selects one of the table ROMs 64a to 64f for adjustment of density in accordance with the light and shade level data which is inputted by the operator from the keyboard 31. The selected one of the table ROMs 64a to 64f outputs the dither image control data using the 16-bit parallel dither processing data inputted as an address. For instance, the dither image data is inputted to the table ROM 64c and the light and shade of the image are controlled so as to become darker by one step. In this embodiment, the table ROMs 64a to 64f are prepared so that the light and shade can be adjusted in six gradations consisting of three steps of shade and three steps of light. However, the number of table ROMs, namely, the number of gradations, may be increased or decreased in dependence on the demand of the designer.

Figure 7:
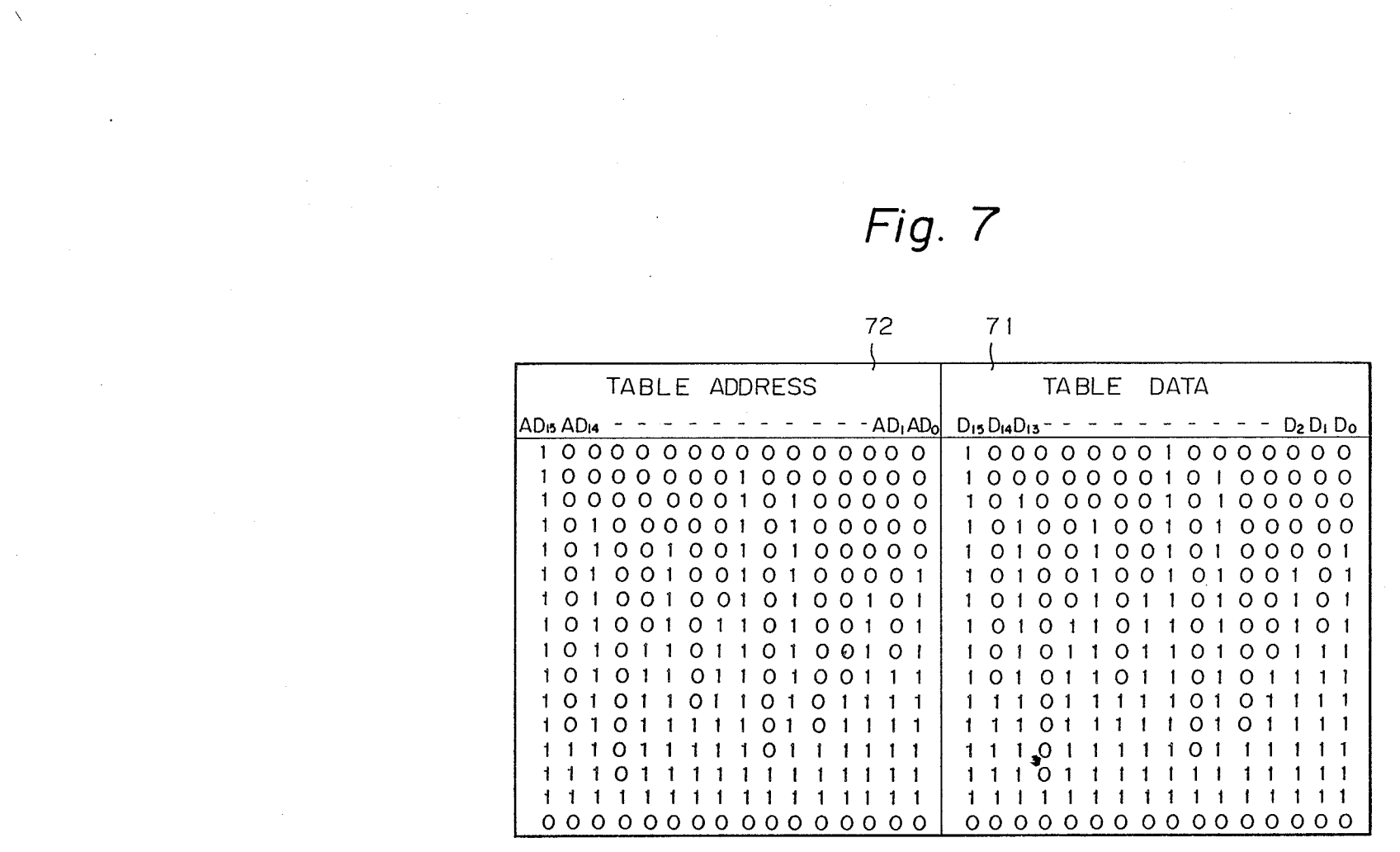

For example, in the table data 71 written in the table ROM 64c, as shown in FIG. 7, respective addresses $AD_0$ to $AD_{15}$ in a table address 72 correspond to the arrangement order of the serial data shown in FIG. 6B and the density is adjusted by the table data 71 so as to become darker by one step. In case where the address data which does not correspond to the dither matrix information is inputted to the table ROM 64c, the address data is directly used as the table data 71. For the dither image control data of 16 bits regarding four bits in the main-scan and four lines in the sub-scan which are outputted from the table ROM 64c, the pixels are inverted through the three-state buffers 65a to 65f on a 4-bit unit basis from the higher significant bits in accordance with the order of the weights of the dither matrix 52, then the dither image control data is latched in the latches 66a to 66d. Subsequently, the dither image control data regarding four bits in the main-scan and four lines in the sub-scan latched in the latches 66a to 66d is fetched on a 4-bit unit basis in the three-state buffers 67a to 67d, each of which consists of four bits and which are sequentially chip-enabled. Further, the dither image control data is divided into four lines and stored as the serial dither image control data in the line memories 68a to 68d. The foregoing process to read out the data from the line buffer memories 62a to 62d on a 16-bit unit basis is performed repeatedly. After completion of the light and shade control process of the dither image signal relative to the image signal stored in the RAM 34, the serial dither image control data is sent out to the input/output interface 37 on a line by line basis from the higher significant bit of the line memories 68a to 68d. In this manner, by rewriting the image signal inputted into the RAM 34, into dither image control data on a 4-line unit basis by means of the density processing circuit 43, the light and shade of the dither image can be controlled.

In the foregoing embodiment, the process to control the dither image signal on a 16-bit unit basis has been described with regard to the case where the light and shade are adjusted by six steps by way of the table ROMs 64a to 64f. However, the light and shade of images can be arbitrarily controlled by increasing or decreasing the number of tables. Therefore, the light and shade of images can be arbitrarily controlled even with respect to other dither images than the dither image which is extracted by means of the dither matrix of 4×4. In addition, in a digital copier using a laser beam printer as well, as auxiliary means of the density setting means on the reader side, the density may be digitally controlled on the printer side. Further, in the foregoing embodiment, the process to evenly control the dither image signal on a 16-bit unit basis has been described with respect to the case where the light and shade are adjusted by six steps by way of the table ROMs 64a to 64f. However, for example, in the case where the unit pixel in which the level of weight 1 is black and the unit pixel in which the level of weight 10 is black are made darker uniformly by one level, the unit pixel in which the level of weight 1 is black is adjusted to have double the original density, while the unit pixel in which the level of weight 10 is black is adjusted such that the density is increased by only about ten percent as a whole. To prevent such a non-linear density adjustment, if the apparatus is constituted such that, for example, the dither matrix of 8×8 can be selected with a certain reference, the image density can also be controlled more linearly.

As described above, according to a present invention, there is provided the density processing means for controlling the light and shade of the dither image information stored in the image storage means in response to the density control command. Therefore, there is an advantage that, for instance, the image density of the dither image information stored in the image file can be arbitrarily controlled.

The present invention is not limited to the foregoing embodiments but many modifications and variations are possible within the spirit and scope of the appended claims of the invention.

What we claim is:

1. An image processing apparatus comprising:
input means for inputting a plurality of bi-level image signals of a predetermined plural number of bits each corresponding to a respective portion of a predetermined area, the bi-level image signals having been binarization-processed;
a table memory comprising a conversion table using the bi-level image signals as multi-bit input addresses, for correcting density of the input bi-level image signals by changing a number of pixels to be visualized in the predetermined area and for outputting a plurality of density-corrected bi-level image signals having a number of bits equal to the predetermined number of bits; and
visible-output means for outputting an output of said table memory as a visible output, wherein, in said table memory, a plurality of conversion tables are provided according to a density correction amount.

2. An image processing apparatus according to claim 1, which further comprises storage means for storing the binarization-processed image signals, and in which said input means reads out said binarization-processed image signals from said storage means.

3. An image processing apparatus according to claim 1, wherein said table memory has a number of input address bits equal to a number of threshold values which have been used in the binarization process of the binarization-processed image signal.

4. An image processing apparatus according to claim 1, wherein, more specifically, said input means is structured and arranged for inputting, as the bi-level image signal, a bi-level image signal which has been subjected to binarization-processed including a dither processing, with respect to one pixel.

5. An image processing apparatus according to claim 4, wherein, more specifically, said conversion table is structured and arranged to use, as the bi-level image signal used as a multi-bit input address, a signal determined in accordance with a pattern of the dither processing.

6. An image processing apparatus comprising:
input means for inputting a plurality of bi-level image signals each corresponding to a respective pixel in a multi-pixel block, each of the bi-level image signals being one which has been binarization-processed; and
output means for making changeable, for each block, a number of pixels to be visualized in said block so as to make a density of the block changeable, and for outputting the plurality of bi-level image signals after processing to make the density of the block changeable.

7. An apparatus according to claim 6, further comprising storage means for storing the binarization-processed image signal, and wherein said input means reads out the binarization-processed image signal from said storage means.

8. An apparatus according to claim 6, wherein, more specifically, said input means is for inputting, as the bi-level image signal, a bi-level image signal which has been subjected to binarization-processing including a dither processing.

9. An apparatus according to claim 6, wherein said output means includes a table memory which outputs the plurality of level-changed bi-level image signals by using the input bi-level image signal of each pixel as an address.

10. An apparatus according to claim 6, further comprising visible-output means for visibly outputting the level-changed bi-level image signals output by said output means.

* * * * *

UNITED STATES PATENT AND TRADEMARK OFFICE
CERTIFICATE OF CORRECTION

PATENT NO. : 4,972,500
DATED : November 20, 1990
INVENTOR(S) : HIROAKI ISHII, ET AL.

Page 1 of 2

It is certified that error appears in the above-identified patent and that said Letters Patent is hereby corrected as shown below:

COLUMN 1

Line 22, "is" should read --are--.

COLUMN 2

Line 56, "mutual" should be deleted.

COLUMN 3

Line 8, "voted." should read --noted.--
Line 34, "thinning out" should read --thinning-out--.
Line 43, "cable 13, 14a and 14b." should read --cables 13, 14a and 14b.--.

COLUMN 4

Line 7, "outputs" should read --outputs it--.
Line 34, "operation," should read --operation--.
Line 38, "real time" should read --real-time--.
Line 62, "values" should read --values,--.

COLUMN 5

Line 22, "matrix 52," should read --matrix 52--.
Line 23, "weight" should read --a weight--.
Line 26, "the weights" should read --a weight--.

COLUMN 6

Line 39, "case where the" should read --the case where--.

UNITED STATES PATENT AND TRADEMARK OFFICE
CERTIFICATE OF CORRECTION

PATENT NO. : 4,972,500

DATED : November 20, 1990

INVENTOR(S) : HIROAKI ISHII, ET AL.

Page 2 of 2

It is certified that error appears in the above-identified patent and that said Letters Patent is hereby corrected as shown below:

COLUMN 7

Line 37, "the" should read --a--.

COLUMN 8

Line 17, "signal." should read --signals.--.
    Line 22, "binarization-processed" should read --binarization-processing--.

Signed and Sealed this

Twenty-fourth Day of December, 1991

Attest:

HARRY F. MANBECK, JR.

*Attesting Officer*      *Commissioner of Patents and Trademarks*